United States Patent

[11] 3,627,836

| [72] | Inventor | John Charles Getson<br>Tecumseh, Mich. |
|---|---|---|
| [21] | Appl. No. | 776,863 |
| [22] | Filed | Nov. 15, 1968 |
| [45] | Patented | Dec. 14, 1971 |
| [73] | Assignee | Stauffer-Wacker Silicone Corporation |

[54] MODIFIED ORGANOPOLYSILOXANES WITH MONO AND POLYOLEFINIC CROSS-LINKED PARTICLES GENERATED IN SITU
10 Claims, No Drawings

[52] U.S. Cl........................................................ 260/825,
117/132 BS, 117/161 ZA, 204/159.13, 260/18 S,
260/23 R, 260/33.6 SB, 260/41 A, 260/41 B,
260/41 R, 260/41 AG, 260/41.5 R, 260/41.5 A,
260/827
[51] Int. Cl......................................................... C08g 47/10
[50] Field of Search............................................ 260/827,
825

[56] References Cited
UNITED STATES PATENTS

| 2,965,593 | 12/1960 | Dietz............................ | 260/827 |
|---|---|---|---|
| 3,436,252 | 4/1969 | Neuroth........................ | 260/827 |
| 3,441,537 | 4/1969 | Lengnick...................... | 260/827 |

FOREIGN PATENTS

| 860,327 | 2/1961 | Great Britain................ | 260/827 |

OTHER REFERENCES

Bartl et al., German application 1,136,104, printed September 6, (10) 1962

*Primary Examiner*—Samuel H. Blech
*Attorney*—Marion D. Ford

ABSTRACT: Modified organopolysiloxanes containing cross-linked particles generated in situ are prepared by grafting monofunctional and polyfunctional olefinic monomers to organopolysiloxanes. These modified silicones are resistant to the solubilizing effect of solvents.

MODIFIED ORGANOPOLYSILOXANES WITH MONO AND POLYOLEFINIC CROSS-LINKED PARTICLES GENERATED IN SITU

This invention relates to modified organopolysiloxanes, particularly modified organopolysiloxanes containing particulate matter generated in situ and more particularly to modified organopolysiloxanes containing cross-linked particulate matter generated in situ. These modified organopolysiloxanes may be further modified to form room-temperature-curable organopolysiloxanes having improved properties.

It is known that microscopic particulate matter may be generated in situ in organopolysiloxane systems by grafting monomers to organopolysiloxanes under carefully controlled reaction conditions to produce stable organopolysiloxanes having desirable properties. Thus, in many cases, the particulate matter so formed has a reinforcing effect and produces notable improvement in such properties as tensile strength and tear strength. The effect is especially pronounced in room-temperature-curable organopolysiloxanes.

While these graft-modified polymers have some desirable properties, they are inadequate in others, especially where solvent resistance is desired. Solvents generally have a bad effect on the modified polymers in the uncured state. They cause the particles to soften and swell, then to agglomerate with considerable increase in viscosity. Finally, complete phase inversion may occur, so that the physical properties are essentially those of a thermoplastic organic polymer. This is a serious disadvantage in many applications, e.g., in coating applications where it is desirable to thin with solvent for ease of spreading.

Therefore, it is an object of this invention to provide modified organopolysiloxanes containing cross-linked particulate matter. Another object of this invention is to provide a method for cross-linking in situ generated particulate matter. A further object of this invention is to provide room-temperature-curable modified organopolysiloxanes having improved solvent resistance.

The foregoing objects and others which will become apparent from the following description are accomplished in accordance with this invention, generally speaking, by providing modified organopolysiloxanes containing cross-linked particles generated in situ. These modified organopolysiloxanes may be prepared by contacting an organopolysiloxane with a polymerizable monofunctional monomer and a polymerizable polyfunctional monomer in the presence of a free-radical initiator under controlled conditions.

The organopolysiloxanes used in the grafting step may be represented by the formula:

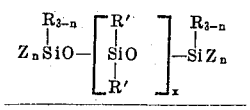

wherein the R(s), which may be the same or different, represent monovalent hydrocarbon radicals; R'(s), which may be the same or different, represent monovalent hydrocarbon radicals, halogenated monovalent hydrocarbon radicals, or cyanoalkyl radicals; Z represents a functional group which may be hydrolyzable or condensable such as hydrogen, hydroxyl, halogen, amino, aminoxy, amido, oximo, aryloxy, acyloxy, or alkoxy groups; $n$ is a number of from 1 to 3 and $x$ is a number of from 1 to 20,000. In the above formula, R and R', which may be the same or different, represent organic radicals, such as alkyl radicals, e.g., methyl, ethyl, propyl, and butyl, and aryl radicals, e.g., phenyl and tolyl, also R' may represent halogenated monovalent hydrocarbon radicals, such as chlorophenyl and the like.

Any organosiloxane polymer capable of forming free radicals or active sites by hydrogen abstraction and substantially free of any tendency to undergo further polymerization under the conditions employed may be used in the grafting step. Also, it is preferred that the siloxane polymer be substantially free of any aliphatic unsaturation; however, a low degree of any such unsaturation does not preclude the desired reaction even though it may set up a competitive reaction. Preferably, the organopolysiloxane should have lower alkyl radicals attached to the silicon atoms since these are more amenable to hydrogen abstraction than other radicals.

Examples of suitable organosiloxane polymers and copolymers which may be used in the formation of the modified polymers are hydroxyl-terminated siloxane fluids (OH-fluids), methylphenylsiloxane fluids, copolymers of dimethylsiloxane, and methylphenyl- or diphenylsiloxane units, and trimethylsiloxy endblocked polymers of dimethylsiloxanes. Hydroxyl-terminated siloxanes are preferred for room-temperature-curing applications.

Although the organopolysiloxanes used in the formation of the modified organopolysiloxanes may have a wide range of viscosities, it is preferred that the viscosity be from about 100 to 20,000 c.p.s. and more preferably from about 250 to 10,000 c.p.s. at 25° C.

The monofunctional monomer may be any polymerizable mono-olefinic monomer. Examples of suitable olefinic compounds are low-molecular-weight straight-chain hydrocarbons, such as ethylene, propylene, butylene; halogenated straight-chain hydrocarbons, for vinyl halides, such as vinyl fluoride and vinyl chloride; vinyl esters, such as vinyl acetate; vinyl containing aromatics, such as styrene, ring-substituted styrenes, and other aromatics, such as vinylpyridine and vinylnaphthalene; unsaturated acids, such as acrylic acid and their derivatives, including the salts, esters, amides, and unsaturated nitriles, such as acrylonitrile; N-vinyl compounds, such as N-vinylcarbazole, N-vinylpyrrolidone, and N-vinylcaprolactam; and vinylsilicon compounds, such as vinyltriethoxysilane.

Disubstituted ethylenes of the type $CH_2=CX_2$ may be used, including vinylidene fluoride, vinylidene chloride, vinylidene cyanide, methacrylic acid, and compounds derived therefrom, such as the salts, esters, and amides as well as methacrolein, methacrylonitrile, and the like.

Disubstituted ethylenes of the type $CHX=CHX$, such as vinylene carbonate and various monomers which polymerize best in the presence of other monomers, e.g., maleic anhydride, esters of maleic and fumaric acids, stilbene, indene, and coumarone, may be used in the formation of these modified polymers.

The monofunctional monomer may also be a conjugated diolefin, such as 1,3-butadiene, isoprene, or chloroprene, inasmuch as the second double bond in these monomers is not readily available for cross-linking.

Monomers of the types mentioned above may be used singly or in combinations of two or three or even more in the grafting step. The properties of the modified product, of course, depend upon the nature of the monomeric materials as well as on the amounts used relative to the organosiloxane polymer.

The polyfunctional monomers must have a functionality of at least two. The term "polyfunctional" is intended to include difunctional and trifunctional monomers; that is, monomers having at least two nonconjugated olefinic linkages. Preferably, the olefinic groups should have nearly equal reactivity.

Examples of suitable polyfunctional monomers are esters, such as allyl methacrylate, allyl acrylate, diallyl adipate, methallyl acrylate, methallyl methacrylate, vinyl acrylate, vinyl methacrylate; ethers, such as divinyl ether of diethylene glycol; and hydrocarbons, such as divinylbenzene and vinylcyclohexene.

Especially suitable polyfunctional monomers are the polyol esters of acrylic and methacrylic acid, e.g., ethylene dimethacrylate, tetramethylene diacrylate, 1,3-butylene dimethacrylate, trimethylolpropane trimethacrylate, and pentaerythritol tetramethacrylate.

The amount of polyfunctional monomer employed in the formation of the cross-linked modified organopolysiloxanes is rather critical; however, the preferred range being from about 0.05 to about 5 percent and more preferably from about 0.1 to 1.0 percent, based on the weight of monofunctional monomer.

Where the amount of polyfunctional monomer exceeds the above limits, gelation of the system will occur.

The proportion of organopolysiloxane used in the grafting step may be varied within wide limits; however, it is preferred that the siloxane comprise from 25 to 60 percent by weight of the reactants. Higher proportions may be used but the properties of the resulting modified siloxane are inferior. When the siloxane content is below about 25 percent of the reactants, an unusable semisolid product may result.

In preparing the modified organopolysiloxanes of this invention, the grafting operation is most expeditiously effected by using free-radical initiators, normally organic peroxides, although other free-radical initiators, normally organic peroxides, although other free-radical initiators, such as azo-compounds may be used. Ionizing radiation may also be used to bring about the formation of free radicals.

The most suitable peroxide initiators are compounds of the formula ROOH, ROOR, or RCOOOR in which R is an organic radical. Specific examples of peroxides which are operative in this invention are hydroperoxides, such as t-butyl hydroperoxide, cumene hydroperoxide, and decalin hydroperoxide; dialkyl peroxides, such as di-t-butyl and dicumyl peroxide; cyclic peroxides, such as ascaridole and 1,5-dimethylhexane-1,5-peroxide; peresters, such as t-butyl perbenzoate, t-butylperoxy isopropyl carbonate, and t-butyl peroctoate; keto peroxides, such as acetone peroxide and cyclohexanone peroxide. Diacyl peroxides such as benzoyl peroxide may also be used.

The amount of free-radical initiator used is not critical. As little as 0.05 percent of the more active peroxide initiators, based on the weight of the monomers, is adequate in most cases. Where it is desirable to increase the reaction rate, as much as 3 percent or even more of the initiator may be used.

Although the temperature employed is not critical, it is preferred that the grafting and cross-linking be conducted at temperatures below about 150° C. and more preferably at temperatures between about 50° and 150° C.

The preparation of the modified organopolysiloxanes may occur in the presence or absence of an inert organic solvent. Where reactive monomers are used in the grafting operation, a volatile organic solvent may be used to control the temperature by evaporation and reflux. Any organic solvent boiling within the range of from about 50° to about 150° C. and having a relatively low chain transfer constant may be used in the grafting step.

Examples of suitable solvents are aromatic hydrocarbons, such as benzene, toluene, xylene; chlorinated aromatic hydrocarbons, such as chlorobenzene; aliphatic hydrocarbons, such as pentane, hexane, octane; cycloaliphatic hydrocarbons, such as 1,1-dimethyl-cyclopentane, and cyclohexane. Other solvents which may be used are esters such as methyl acetate, ethyl acetate, propyl acetate, n-butyl acetate, amyl acetate, isoamyl acetate, methyl butyrate, and ethyl valerate.

When a solvent is used, it should be within the range of from about 2 to about 50 percent, preferably from about 10 to 40 percent by weight of the composition, e.g., solvent and reactants.

Grafting and cross-linking normally occur simultaneously, particularly when all of the polyfunctional monomer is present during the initial grafting step. In another embodiment, the polyfunctional monomer may be added to the grafted composition after the initial grafting has occurred; in this case, then the cross-linking occurs as a separate step. In either case, only the dispersed particulate matter is cross-linked, and the bulk of the material remains fluid. The products, where desirable, may be separated from the unreacted monomers by any conventional technique known in the art, such as by distillation, solvent extraction, or selective solvent fractionation.

It will be understood that in a grafting operation, part of the original organopolysiloxane may remain ungrafted. Also there may be present as byproduct a certain amount of organic homopolymer which is not bonded to the organopolysiloxane. The terms "grafted organosiloxane" or "graft-modified polymer" as used here refer to the entire polymeric composition, in which part or all of the organic polymer is bonded to the organopolysiloxane polymer, and which may contain ungrafted organopolysiloxanes.

The modified organopolysiloxanes thus prepared may be used as room-temperature-curable elastomers. For example, in a one-component system, the modified polymer may be endblocked with groups which are hydrolyzable in ambient moisture. Silanes of the general formula $X_{4-m}SiY_m$ wherein X is a relatively unreactive group, such as alkyl, or aryl; Y is an acyloxy, oximo, alkoxy, aryloxy, halogen, aminoxy, amido, or phosphato group; and $m$ is an integer of from 3 to 4, are added as endblocking agents to hydroxyl-terminated modified organopolysiloxanes, thereby replacing the hydroxyl groups with functional groups of the type $OSiX_{4-m}Y_{m-1}$. Examples of these silanes are methyltriacetoxysilane, isopropyltriacetoxysilane, isopropoxytriacetoxysilane, methyltriacetoximosilane, methyltris-diethylaminoxysilane, methyltris(diethylphosphato)silane, and the like.

Generally, the endblocking agent is added to the modified organopolysiloxanes immediately after their formation while the same are still hot or at least warm. Under these conditions, the terminal hydroxyl groups carried by the modified organopolysiloxane are converted to hydrolyzable functional groups. These compositions may be cured by merely exposing them to atmospheric moisture with or without any additional water vapor. Upon exposure to moisture, the compositions are cured at times varying from a few minutes to several hours or days.

In the two-component system, hydroxyl-terminated modified organopolysiloxanes are mixed with curing agents, such as polyalkoxysilanes of the formula $(R''O)_zSiR'''_{4-z}$ or polyalkoxysiloxanes in which the silicon atoms are linked through Si—O—Si linkages and the remaining valences of the silicon atom are satisfied by R''O and R'''. In the above formula, the groups represented by R'' and R''' are monovalent hydrocarbon radicals having less than eight carbon atoms, and $z$ has a value of from 3 to 4. Examples of monovalent hydrocarbon radicals are methyl, ethyl, propyl, butyl, hexyl, phenyl, vinyl, allyl, ethylallyl, butadienyl, and the like. The polyalkoxysilanes used herein include monoorganotrihydrocarbonoxysilicanes, tetrahydrocarbonoxysilanes, alkyl silicates, and partial hydrolyzates of such silanes. The polyalkoxy compounds, e.g., ethyl orthosilicate or partially hydrolyzed ethyl silicates, such as ethyl silicate "40," which consists primarily of decaethyl tetrasilicate, are representative examples of these compounds. Other operative curing agents are ethyltrimethoxysilane, methylbutoxydiethoxysilane, propyltripropoxysilane, methyltriethoxysilane, ethyltriethoxysilane, ethyl orthosilicate, and n-butyl orthosilicate. Examples of alkyl polysilicates are ethyl polysilicate, isopropyl polysilicate, butyl polysilicate, dimethyltetraethoxydisiloxane, trimethylpentabutoxytrisiloxane, and the like.

The polyalkoxysilanes and polyalkoxysiloxanes employed herein may be used either alone or in combination. They should be used in a proportion of from bout 0.5 to about 20 percent or preferably from about 1 to 10 percent by weight based on the weight of the organopolysiloxane. If the total weight of the polyalkoxysilanes or polyalkoxysiloxanes employed is below about 0.5 percent based on the weight of the modified organopolysiloxanes, the cure rate is extremely slow. If, on the other hand, the total weight of the polyalkoxysilanes or polyalkoxysiloxanes is about 10 percent based on the weight of the modified organopolysiloxanes, the cure time will not be substantially reduced.

The modified organopolysiloxane compositions are cured by mixing the hydroxyl-terminated organopolysiloxanes with the polyslkoxysilanes or the polyalkoxysiloxanes in the presence of a catalyst, preferably a metallic salt or compound. The metallic component of the catalyst is preferably tin, but may be lead, chromium, antimony, iron, cadmium, barium, calcium, titanium, bismuth, or magnesium. Examples of suitable salts are tin naphthenate, lead octoate, tin octoate, iron stearate, tin oleate, antimony octoate, tin butyrate, and the like. Organotin catalysts which may be used include dibutyltin dilaurate, bis(dibutylphenyltin) oxide, bis(acetoxydibutyltin) oxide, bis(tributyltin) oxide, dibutoxydibutyltin, tri-t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride, and the like. These catalysts may be dispersed in a solvent and then added to the hydroxyl-terminated modified organopolysiloxanes or they may be dispersed on a suitable filler or additive and thereafter milled with a modified polymer. Examples of suitable hydrocarbon solvents are benzene, toluene, xylene, and the like. Also, halogenated hydrocarbon, such as tetrachloroethylene or chlorobenzenes; organic ethers, such as diethyl ether, dibutyl ether, and the like; and hydroxyl-free fluid polysiloxanes may be used as solvents. It is preferred that the solvent used for dispersing the catalyst be the same or at least miscible with the solvent used in the formation of the modified organopolysiloxanes. Also, the solvent should be sufficiently volatile to evaporate at room temperature.

These modified organopolysiloxanes may be compounded in the usual manner for preparing conventional siloxane elastomers. However, when the materials are stored prior to use it is essential that either the catalyst or the polyalkoxysilane or polyalkoxysiloxane curing agent be stored separately. In other words, the hydroxyl-terminated modified organopolysiloxanes, curing agent, and filler, if desired, may be compounded and the catalyst added just prior to use. In another method, the amount of the organopolysiloxane, catalyst, and filler, if desired, may be compounded and a curing agent added just prior to use. Where an inert filler is used, it may be added to either the hydroxyl-terminated modified organopolysiloxane or the curing agent prior to the addition of the catalyst or immediately after the reactants have been combined. Upon mixing these ingredients, the compositions cure spontaneously at room temperature.

The amount of catalyst used in these curing systems may range from 0.05 to about 2 percent by weight, preferably from about 0.1 to about 1 percent by weight based on the weight of the composition. A mixture of two or more of the catalysts mentioned above may be used, if desired. The amount of catalyst added to the base composition is determined by the requirements of the particular job, especially the pot life or working time required. For example, in caulking a working time of 1 to 2 hours is required; thus an amount of catalyst is added that will not result in any substantial stiffening of the caulking composition in a shorter time. Normally, the composition is tack-free within 2 to 4 hours following the caulking operation and substantially cured after about 24 hours and completely cured after about 7 days. The period of time may vary somewhat with changes in humidity and temperature.

Although not essential, fillers may be incorporated in these modified organopolysiloxane compositions. Examples of suitable fillers are fumed silicas, high-surface-area precipitated silicas, and silica aerogels, as well as coarser silicas, such as diatomaceous earth, crushed quartz, and the like. Other fillers which may be used are metallic oxides, such as titanium oxide, ferric oxide, zinc oxide; fibrous fillers, such as asbestos, fibrous glass, and the like. Organic fillers having a thixotropic effect, such as lithium stearate and Thixcin R, a castor oil derivative, may be used. Additives, such as pigments, antioxidants, ultraviolet absorbers, and the like, may be included in these compositions.

The cross-linked organopolysiloxanes are resistant to the solubilizing effect of solvents. That is, solvents which normally dissolve equivalent uncross-linked particulate matter have only a slight swelling effect on the cross-linked particulate matter. In addition, the uncross-linked system in the presence of about 50 percent toluene will change abruptly from a Newtonian liquid to a gellike mass with a loss of definitive particulate matter. Removal of the solvent results in a thermoplastic material. In the cross-linked system, there is a gradual reduction in Newtonian viscosity up to about 75 percent toluene. Above this concentration, the solution becomes thixotropic and again above about 90 percent toluene returns to a Newtonian liquid. Examination of the cross-linked material shows the presence of definitive particulate matter with only slight swelling of the particles. Upon removal of the solvent, the material returns to its original physical state, viz a liquid.

The cross-linked modified organopolysiloxanes may be diluted with a variety of solvents for various commercial applications without destroying the particulate matter. Also, they show increased lubricity, increased thermal stability, and stability towards hydrolysis. These compositions are suitable as lubricants, hydraulic fluids, elastomeric and plastic sealants, gaskets, encapsulants, adhesives, and protective coatings.

Various embodiments of this invention are further illustrated by the following examples in which all parts are by weight unless otherwise specified.

EXAMPLE 1 a. To a reactor were introduced 437.2 parts of styrene, 1,256.1 parts of butyl acrylate, 1.7 parts of 1,3-butylene dimethacrylate, 1,128.9 parts of 400 c.p. hydroxyl-terminated polydimethylsiloxane and 8.47 parts of di-$t$-butyl peroxide. The reactor was purged with nitrogen and the reactants heated at 126°–130° C. for 4 hours with agitation. The unreacted monomers were removed at elevated temperature under a vacuum of about 1 mm. Hg or less.

About 50 parts of the liquid product was mixed with about 1.5 parts of ethyl silicate "40" and 0.5 parts of dibutyltin butoxychloride, poured into a mold and cured at room temperature at a relative humidity of from 30 to 70 percent for 7 days.

b. To about 100 parts of the modified organopolysiloxane polymer prepared above were added 25 parts of toluene with agitation and stored for 24 hours in a closed container. The toluene was then removed under vacuum yielding a liquid product.

About 50 parts of the liquid product was mixed with about 1.5 parts of ethyl silicate "40" and 0.1 parts of dibutyltin butoxychloride, poured into a mold and cured at room temperature at a relative humidity of from 30 to 70 percent for 7 days.

c. To about 100 parts of the modified organopolysiloxane polymer prepared in accordance with the procedure described in example 1 (a) above were added 66.7 parts of toluene with agitation and stored for 24 hours in a closed container. After removing the toluene under vacuum, a liquid product was obtained.

About 50 parts of the liquid product was mixed with about 1.5 parts of ethyl silicate "40" and 0.5 parts of dibutyltin butoxychloride, poured into a mold and cured at room temperature at a relative humidity of from 30 to 70 percent for 7 days.

d. About 100 parts of the modified organopolysiloxane polymer prepared in example 1 (a) above was mixed with about 150 parts of toluene and stored for 24 hours in a closed container. After removing the toluene, about 50 parts of the liquid product was mixed with about 1.5 parts of ethyl silicate "40" and 0.5 parts of dibutyltin butoxychloride and cured at room temperature at a relative humidity of from 30 to 70 percent for 7 days.

The physical properties of the cured modified organopolysiloxanes prepared in examples 1 (a–d) are illustrated in table I.

EXAMPLE 2 a. To a reactor were introduced 437.2 parts of styrene, 1,256.1 parts of butyl acrylate, 1,128.9 parts of 400 c.p. hydroxyl-terminated polydimethylsiloxane and 8.47 parts of di-$t$-butyl peroxide. The reactor was purged with nitrogen and the reactants heated at 126°–130° C. for 4 hours with agitation. The unreacted monomers were removed at elevated temperature under a vacuum of about 1 mm. Hg or less.

About 50 parts of the liquid product was mixed with about 1.5 parts of ethyl silicate "40" and 0.5 parts of dibutyltin butoxychloride, poured into a mold and cured at room temperature at a relative humidity of from 30 to 70 percent for 7 days.

b. To about 100 parts of the modified organopolysiloxane polymer prepared above were added 25 parts of toluene with agitation and stored for 24 hours in a closed container. The toluene was then removed under vacuum yielding a liquid product.

About 50 parts of the liquid product was mixed with about 1.5 parts of ethyl silicate "40" and 0.1 parts of dibutyltin butoxychloride, poured into a mold and cured at room temperature at a relative humidity of from 30 to 70 percent for 7 days.

c. To about 100 parts of the modified organopolysiloxane polymer prepared in accordance with the procedure described in example 2 (a) above were added 66.7 parts of toluene with agitation and stored for 24 hours in a closed container. After removing the toluene under vacuum, a liquid product was obtained.

About 50 parts of the liquid product was mixed with about 1.5 parts of ethyl silicate "40" and 0.5 parts of dibutyltin butoxychloride, poured into a mold and cured at room temperature at a relative humidity of from 30 to 70 percent for 7 days.

d. About 100 parts of the modified organopolysiloxane polymer prepared in example 2 (a) above was mixed with about 150 parts of toluene and stored for 24 hours in a closed container. After removing the toluene under vacuum, a thermoplastic material was obtained which could not be cured.

The physical properties of the uncross-linked modified organopolysiloxanes of examples 2 (a–d) are illustrated in table I. It can be seen tat the physical properties of the cross-linked and uncross-linked systems are equivalent, except in solvent resistance.

agitation and stored for 24 hours in a closed container. After removing the toluene under vacuum, a liquid product was obtained.

About 50 parts of the liquid product was mixed with about 1.5 parts of ethyl silicate "40" and 0.5 parts of dibutyltin butoxychloride, poured into a mold and cured at room temperature at a relative humidity of from 30 to 70 percent for 7 days.

d. About 100 parts of the modified organopolysiloxane polymer prepared in example 3 (a) above were mixed with about 150 parts of toluene and stored for 24 hours in a closed container. After removing the toluene, about 50 parts of the liquid product were mixed with about 1.5 parts of ethyl silicate "40" and 0.5 parts of dibutyltin butoxychloride and cured at room temperature at a relative humidity of from 30 to 70 percent for 7 days.

The physical properties of the cured modified organopolysiloxanes prepared in examples 3 (a–d) are illustrated in table II.

EXAMPLE 4 a. To a reactor were introduced 999.2 parts of styrene, 820 parts of butyl acrylate, 1,212.8 parts of 400 c.p. hydroxyl-terminated polydimethylsiloxane, and 9.12 parts of di-$t$-butyl peroxide. The reactor was purged with nitrogen and the reactants heat at 126°–130° C. for 4 hours with agitation. The unreacted monomers were removed at elevated temperature under a vacuum of about 1 mm. Hg or less.

About 50 parts of the liquid product were mixed with about 1.5 parts of ethyl silicate "40" and 0.5 parts of dibutyltin butoxychloride, poured into a mold and cured at room temperature at a relative humidity of from 30 to 70 percent for 7 days.

TABLE I

| Example No. | BDMA, percent | Toluene, percent | Physical properties ||||| 
| | | | Tensile, p.s.i. | Elongation, percent | Tear, lb./in. | Hardness, Shore A | Modulus,* p.s.i. |
|---|---|---|---|---|---|---|---|
| 1 (a) | 0.1 | 0 | 572 | 204 | 48 | 34 | 225 |
| (b) | 0.1 | 20 | 245 | 177 | 63 | 32 | 214 |
| (c) | 0.1 | 40 | 658 | 186 | 38 | 33 | 245 |
| (d) | 0 1 | 60 | 439 | 156 | 26 | 28 | 219 |
| 2 (a) | 0.0 | 0 | 742 | 197 | 34 | 32 | 289 |
| (b) | 0.0 | 20 | 290 | 156 | 46 | 33 | 274 |
| (c) | 0.0 | 40 | 526 | 140 | 46 | 32 | 281 |
| (d) | 0.0 | 60 | (Uncurable thermoplastic) |||||

BDMA=1,3-butylene dimethacrylate.
*=Modulus at 100% elongation.

EXAMPLE 3 a. To a reactor were introduced 999.2 parts of styrene, 820 parts of butyl acrylate, 9.12 parts of allyl methacrylate, 1,212.8 parts of 400 c.p. hydroxyl-terminated polydimethylsiloxane, and 9.12 parts of di-$t$-butyl peroxide. The reactor was purged with nitrogen and the reactants heated at 126°–130° C. for 4 hours with agitation. The unreacted monomers were removed at elevated temperature under a vacuum of about 1 mm. Hg or less.

About 50 parts of the liquid product were mixed with about 1.5 parts of ethyl silicate "40" and 0.5 parts of dibutyltin butoxychloride, poured into a mold and cured at room temperature at a relative humidity of from 30 to 70 percent for 7 days.

b. To about 100 parts of the modified organopolysiloxane polymer prepared above were added 25 parts of toluene with agitation and stored for 24 hours in a closed container. The toluene was then removed under vacuum yielding a liquid product.

About 50 parts of the liquid product were mixed with about 1.5 parts of ethyl silicate "40" and 0.1 parts of dibutyltin butoxychloride, poured into a mold and cured at room temperature at a relative humidity of from 30 to 70 percent for 7 days.

c. To about 100 parts of the modified organopolysiloxane polymer prepared in accordance with the procedure described in example 3 (a) above were added 66.7 parts of toluene with b. To about 100 parts of the modified organopolysiloxane polymer prepared above were added 25 parts of toluene with agitation and stored for 24 hours in a closed container. The toluene was then removed under vacuum yielding a liquid product.

About 50 parts of the liquid product were mixed with about 1.5 parts of ethyl silicate "40" and 0.1 part of dibutyltin butoxychloride, poured into a mold and cured at room temperature at a relative humidity of from 30 to 70 percent for 7 days.

c. To about 100 parts of the modified organopolysiloxane polymer prepared in accordance with the procedure described in example 4 (a) above were added 66.7 parts of toluene with agitation and stored for 24 hours in a closed container. After removing the toluene under vacuum, a liquid product was obtained.

About 50 parts of the liquid product were mixed with about 1.5 parts of ethyl silicate "40" and 0.5 parts of dibutyltin butoxychloride, poured into a mold and cured at room temperature at a relative humidity of from 30 to 70 percent for 7 days.

d. About 100 parts of the modified organopolysiloxane polymer prepared in example 4 (a) above were mixed with about 150 parts of toluene and stored for 24 hours in a closed container. After removing the toluene under vacuum, a thermoplastic material was obtained which could not be cured.

The physical properties of the cured uncross-linked modified organopolysiloxanes of example 4 (a–d) are illustrated in table II.

TABLE II

| Example No. | AMA, percent | Toluene, percent | Physical properties ||||||
| --- | --- | --- | --- | --- | --- | --- | --- |
| | | | Tensile, p.s.i. | Elongation, percent | Tear, lb./in. | Hardness, Shore A | Modulus,* p.s.i. |
| 3 (a) | 0.5 | 0 | 1,340 | 284 | 351 | 90 | 854 |
| (b) | 0.5 | 20 | 1,215 | 222 | 316 | 89 | 883 |
| (c) | 0.5 | 40 | 1,183 | 208 | 335 | 89 | 906 |
| (d) | 0.5 | 60 | 1,348 | 281 | 287 | 90 | 869 |
| 4 (a) | 0.0 | 0 | 1,211 | 204 | 390 | 88 | 1,129 |
| (b) | 0.0 | 20 | 1,101 | 141 | 169 | 87 | 1,064 |
| (c) | 0.0 | 40 | 1,205 | 182 | 198 | 90 | 1,040 |
| (d) | 0.0 | 60 | (Uncurable thermoplastic) |||||

AMA = Allyl methacrylate.
*= Modulus at 100% elongation.

The above table shows that an uncross-linked modified organopolysiloxane when diluted with an organic solvent, such as toluene, is converted to a thermoplastic upon removal of the solvent, while the cross-linked system, even in the presence of 60 percent solvent, returns to the original liquid state. With 20-40 percent of solvent, the physical properties, especially elongation and tear strength, are retained better with the cross-linked system.

EXAMPLE 5

To a reactor were introduced 1,820 parts of styrene, 4,160 parts of butyl acrylate, 3,987 parts of hydroxyl-terminated polydimethylsiloxane, 75.6 parts of di-$t$-butyl peroxide, 23.9 parts of 1,3-butylene dimethacrylate and 998 parts of toluene. The reactor was purged with nitrogen and the reactants were heated to 136±2° C. for 4 hours with agitation.

a. About 100 parts of the organopolysiloxane composition prepared in accordance with the procedure described above were mixed with 10 parts of methyltriacetoxysilane and about 11 parts of lithium stearate and applied to previously cleaned and degreased substrates. The composition was cured at room temperature at a relative humidity of from 30 to 70 percent for 7 days and immersed in distilled water for 7 days and tested in accordance with the procedure described in Federal Specification TT-S-230a, 4.3.9.

b. About 100 parts of the organopolysiloxane prepared in example 5 were missed with 10 parts of methyltriacetoxysilane and about 22 parts of Thixcin-R and applied to previously cleaned and degreased substrates. The composition was cured and tested in accordance with the procedure described in example 5 (a) above.

c. In a similar example, about 100 parts of organopolysiloxane prepared in accordance with the procedure of example 3 were mixed with 10 parts of methyltriacetoxysilane and 28 parts of Thixcin-R and applied to previously cleaned and degreased substrates. The composition was cured and tested in accordance with the procedure described in example 5 (a) above.

d. In accordance with the procedure described in example 5 above an organopolysiloxane was prepared in the absence of 1,3-butylene dimethacrylate.

Approximately 100 parts of the modified organopolysiloxanes were mixed with 10 parts of methyltriacetoxysilane and 11 parts of lithium stearate and applied to previously cleaned and degreased substrates. The composition was cured and tested in accordance with the procedure described in example 5 (a) above.

The results of these examples are illustrated in table III in which the cross-linked grafted organopolysiloxanes show improved adhesion on both aluminum and glass substrates.

TABLE III

| Example No. | BDMA, percent | Toluene, percent | Filler adhesion in peel ||||
| --- | --- | --- | --- | --- | --- | --- |
| | | | Type | Parts | Glass, p.s.i. | Aluminum, p.s.i. |
| 5 (a) | 0.4 | 10 | LS | 11 | 6.1 | 18.0 |
| (b) | 0.4 | 10 | T-R | 22 | 15.1 | 11.1 |
| (c) | 0.4 | 10 | T-R | 28 | 14.7 | 12.1 |
| (d) | 0.0 | 10 | LS | 11 | 5.2 | 1-2 |

BDMA = 1,3-butylene dimethacrylate.
LS = Lithium stearate.
T-R = Thixcin-R.

Other polyfunctional monomers, may be used in combination with modified organopolysiloxanes containing substituents other than styrene and butyl acrylate, and the like, without departing from the scope of this invention.

Although the present invention has been defined with specific reference to the above examples, it should be understood that these examples are given merely for purposes of illustration. Other variations which will become apparent to those skilled in the art are to be included within the scope of this invention.

The invention claimed is:

1. A fluid organopolysiloxane composition curable at room temperature and containing cross-linked particulate matter generated in situ comprising from 25 to 60 percent by weight based on the composition of an organopolysiloxane having a viscosity up to about 20,000 centipoises at 25° C. in which the organo groups are free of alkenyl radicals and are selected from the class consisting of monovalent hydrocarbon radicals, halogenated monovalent hydrocarbon radicals and cyanoalkyl radicals and having a polymeric organic side chain grafted to said organopolysiloxane, said organic side chain being constituted of recurring units derived from a monoolefinic monomer and from 0.05 to 5 percent by weight based on the monoolefinic monomer of a nonconjugated polyolefinic monomer, said monoolefinic monomer being selected from the class consisting of straight chain hydrocarbons, halogenated straight chain hydrocarbons, vinyl containing aromatics, unsaturated acids, esters or organic acids unsaturated amides and unsaturated nitriles, said in situ generated cross-linked particulate matter resulting from the graft copolymerization of the organopolysiloxane, monoolefinic monomer and nonconjugated polyolefinic monomer.

2. The composition of claim 1 wherein the initial organopolysiloxane is represented by the formula:

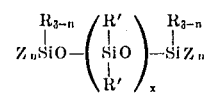

wherein R, which may be the same or different, represents monovalent hydrocarbon radicals; R', which may be the same or different, represents monovalent hydrocarbon radicals, halogenated monovalent hydrocarbon radicals, or cyanoalkyl radicals; Z is selected from the class consisting of hydrolyzable and condensable groups; $n$ is a number of from 1 to 3 and $x$ is a number of from 1 to 20,000.

3. The composition of claim 2 wherein Z represents group hydrolyzable by ambient moisture.

4. The composition of claim 3 wherein Z is selected from the class consisting of halogen, amino, amido, aminoxy, oximo, aryloxy, acyloxy, alkoxy, and phosphato groups.

5. The composition of claim 2 wherein Z represents hydroxyl groups.

6. The composition of claim 1 wherein the polyolefinic monomers are selected from the class consisting of unsaturated hydrocarbons, unsaturated ethers and unsaturated esters.

7. A method for preparing the composition of claim 1 which comprises contacting a composition substantially free of solvent containing an organopolysiloxane having a viscosity up to about 20,000 centipoises at 25° C. in which the organo groups are free of alkenyl radicals and are selected from the class consisting of monovalent hydrocarbon radicals, halogenated hydrocarbon radicals and cyanoalkyl radicals in an amount of from 25 to 60 percent based on the weight of the composition with a monoolefinic monomer and from 0.05 to 5 percent by weight based on the monoolefinic monomer of a nonconjugated polyolefinic monomer in the presence of a free radical initiator to form in situ generated cross-linked particulate matter, said monoolefinic monomer being selected from the class consisting of straight chain hydrocarbons, halogenated straight chain hydrocarbons, vinyl containing aromatics, unsaturated acids, esters of organic acids, unsaturated amides and unsaturated nitriles.

8. The method of claim 1 wherein the initial organopolysiloxane is represented by the formula:

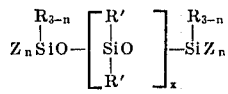

wherein R is a monovalent hydrocarbon radical; R' is selected from the class consisting of monovalent hydrocarbon radicals, halogenated monovalent hydrocarbon radicals, and cyanoalkyl radicals; Z is functional groups selected from the class consisting of hydrolyzable and condensable groups; $n$ is a number of from 1 to 3; and $x$ is a number of from 1 to 20,000.

9. A room-temperature-curable composition comprising the grafted organopolysiloxane of claim 2, wherein Z is a hydroxyl group and further contains a curing agent of the formula $X_{4-m}SiY_m$ wherein X is selected from the group consisting of alkyl and aryl groups and Y is selected from the class consisting of acyloxy, oximo, alkoxy, aryloxy, halogen, aminoxy, amido and phosphato groups and $m$ is a number from 3 to 4.

10. A room-temperature-curable composition comprising the grafted organopolysiloxane of claim 5 and further contains a curing agent selected from the class consisting of polyalkoxysilanes and polyalkoxysiloaxanes and a catalytic amount of a metallic salt.

* * * * *